United States Patent [19]
Mazziotti et al.

[11] Patent Number: 6,102,805
[45] Date of Patent: *Aug. 15, 2000

[54] UNIVERSAL JOINT LUBRICATION SYSTEM

[75] Inventors: Philip J. Mazziotti; Eugene E. Sowers, both of Toledo, Ohio

[73] Assignee: Driveline Technologies, Inc., Oklahoma City, Okla.

[*] Notice: This patent is subject to a terminal disclaimer.

[21] Appl. No.: 09/127,097

[22] Filed: Jul. 31, 1998

Related U.S. Application Data

[63] Continuation-in-part of application No. 08/859,281, May 19, 1997, Pat. No. 5,868,622, which is a continuation-in-part of application No. 08/391,594, Feb. 21, 1995, abandoned.

[51] Int. Cl.[7] .......................................... F16C 1/24
[52] U.S. Cl. ................................. 464/14; 464/23
[58] Field of Search ..................... 464/7, 11, 14, 464/23, 131, 128, 130, 136; 137/256

[56] References Cited

U.S. PATENT DOCUMENTS

| | | | |
|---|---|---|---|
| 666,406 | 1/1901 | Bocorselski | 464/11 |
| 1,841,349 | 1/1932 | Culbertson | 464/14 |
| 1,889,470 | 11/1932 | Garrett | 464/14 |
| 3,326,323 | 6/1967 | Delker | 464/14 |
| 3,545,232 | 12/1970 | Neese et al. | 464/11 |
| 3,785,460 | 1/1974 | Smith et al. | 464/14 |
| 3,828,578 | 8/1974 | Herscovici | 464/14 |
| 3,881,324 | 5/1975 | Girguis | 464/14 |
| 3,991,855 | 11/1976 | Heintzelman | 464/14 |
| 4,103,512 | 8/1978 | McElwain et al. | 464/14 |
| 4,419,086 | 12/1983 | Condon | 464/14 |
| 4,478,591 | 10/1984 | Mangiavacchi | 464/14 |
| 5,188,564 | 2/1993 | Keller | 464/14 |
| 5,263,552 | 11/1993 | Cline et al. | 464/14 |
| 5,660,589 | 8/1997 | Smith | 464/14 |
| 5,868,622 | 2/1999 | Mazziotti et al. | 464/14 |

FOREIGN PATENT DOCUMENTS

| | | | |
|---|---|---|---|
| 59-194133 | 11/1984 | Japan | 464/7 |
| 274670 | 6/1970 | U.S.S.R. | 464/14 |
| 475465 | 6/1975 | U.S.S.R. | 464/14 |
| 972516 | 10/1964 | United Kingdom | 464/14 |

*Primary Examiner*—Lynne H. Browne
*Assistant Examiner*—Greg Binda
*Attorney, Agent, or Firm*—Mary M. Lee

[57] ABSTRACT

A lubrication system designed particularly for small universal joints is provided. It includes a central distribution insert with a system of vertical and transverse passage which enable all four bearing cups and bearings to be sequentially lubricated from a single source. When all four are completely lubricated, lubricant appears at the top of the central distribution insert to assure that all cups have been fully lubricated. Preferably, when the lubricant reaches the distribution insert after the last trunnion, it is directed to a fitting in the distribution insert which is connected via a hose or the like to a container for collecting any excess lubricant. As a result, the uncontrolled discharge of the lubricant into the environment is avoided. The passages in the insert are positioned such that the insert can be made from one two-part mold without any mold inserts being required.

11 Claims, 5 Drawing Sheets

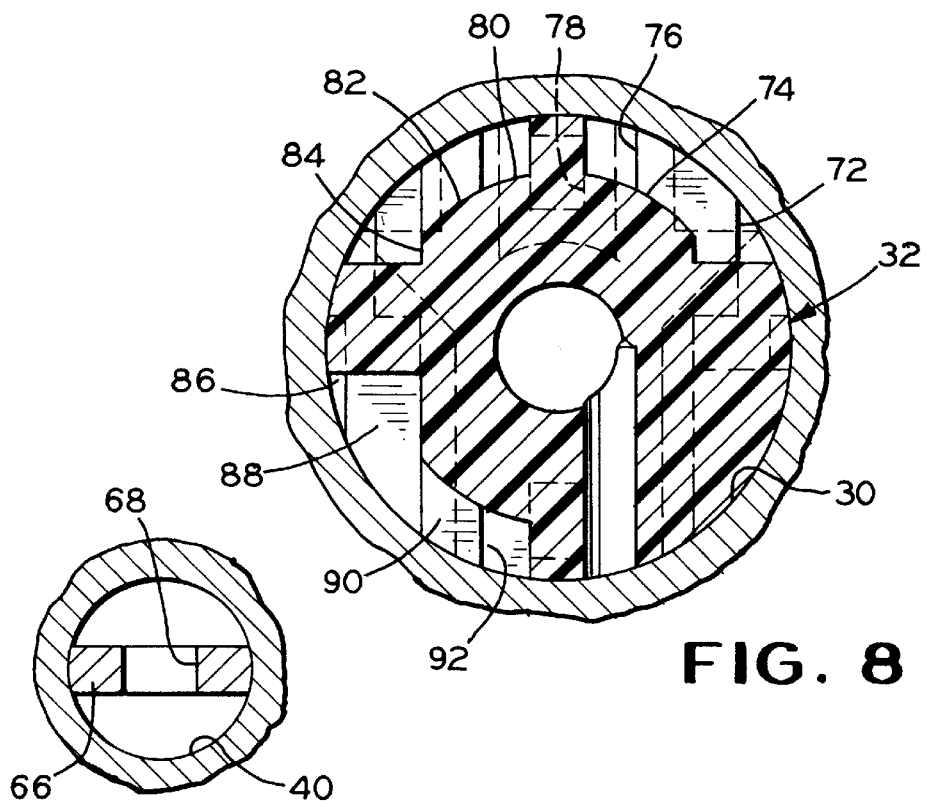
FIG. 8
FIG. 9
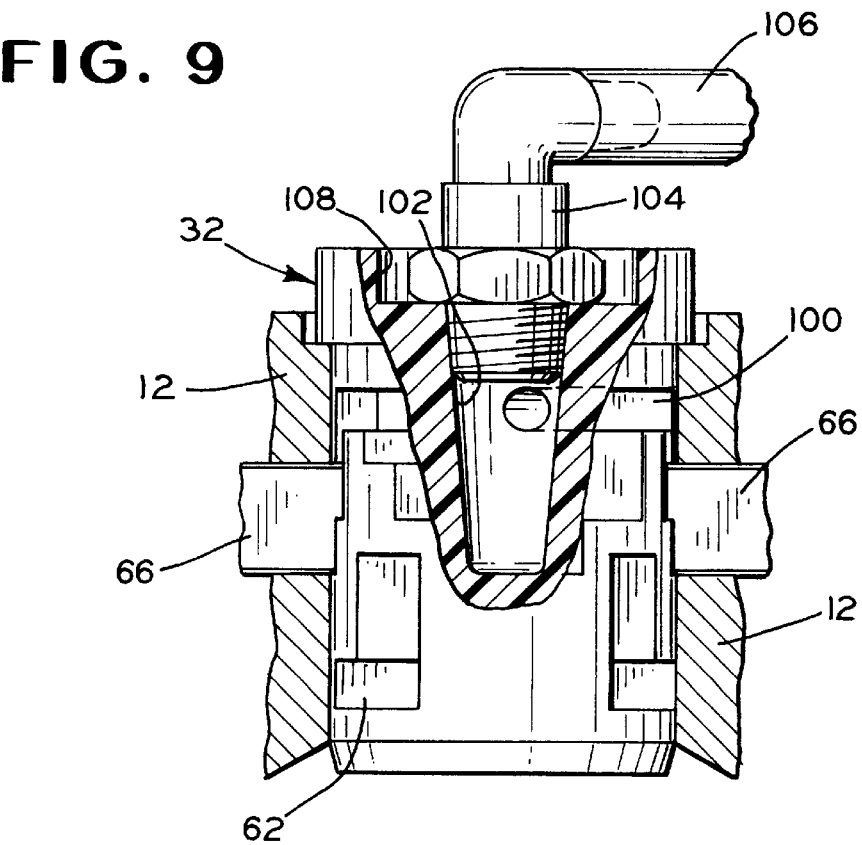
FIG. 10

UNIVERSAL JOINT LUBRICATION SYSTEM

RELATED APPLICATION

This application is a continuation-in-part of application Ser. No. 08/859,281, filed on May 19, 1997 now U.S. Pat. No. 5,868,622 which is a continuation-in-part of application Ser. No. 08/391,594, filed on Feb. 21, 1995 now abandoned. The application Ser. No. 08/859,281 is incorporated herein by reference.

BACKGROUND OF THE INVENTION

This invention relates to universal joints and, more particularly, to a lubrication system for a universal joint cross assembly.

Universal joints are well known devices which provide a driving connection between two members adapted to rotate about non-aligned axes of rotation. A typical universal joint structure includes a cross having a central body portion with four cylindrical trunnions extending outwardly therefrom. The trunnions are oriented in a single plane and extend at right angles relative to one another. A hollow cylindrical bearing cap is mounted on the end of each of the trunnions. Needle bearings or similar means are provided between the outer cylindrical surfaces of the trunnions and the inner cylindrical surfaces of the bearing caps to permit relative rotational movement therebetween.

During operation, the first and second members, as well as the universal joint connected therebetween, rotate as a unit. Whenever the axes of rotation of the first and second members are not coaxially aligned, a small amount of oscillating rotational movement occurs between each of the bearing caps and the trunnions upon which they are mounted. To prolong the life the bearings, a lubricant is provided in each of the bearing cups. Some type of seal is typically provided to retain the lubricant and prevent the entry of dirt into each of the bearing cups.

Certain universal joints are provided with lubrication provisions which allow for the addition of lubricant to the bearing cups without requiring the removal and reinstallation of the bearing cups. Heretofore, with universal joints having such lubrication provisions, a cross body had a central lubricant fitting with the cross body having passages extending outwardly from a central point directly to each of the bearing cups. With such a system, there is no way of knowing whether each of the bearing cups and bearings received proper lubricant if, for example, lubricant was blocked by air pockets, obstructions, etc. This problem may be compounded by the increasingly tight bearing cup seals being utilized, which are more effective in preventing the entry of dirt into the bearing cups, but which further inhibit the purging of air during the introduction of lubricant.

In addition, with the conventional universal joint having the described lubrication provision, lubricant is typically added until excess lubricant escapes from about the open end of one or more of the bearing cups. This results in the uncontrolled discharge of the lubricant into the environment.

BRIEF SUMMARY OF THE INVENTION

The present invention provides a lubrication system for a universal joint cross assembly. The cross assembly includes a universal joint cross having a body and trunnions extending outwardly at mutually perpendicular angles, bearing cups for the trunnions, and bearings between the cups and the trunnions. The universal joint cross assembly is designed particularly for smaller applications. The cross body has a distribution insert or cup located centrally therein to which lubricant is supplied. Bores are made in the cross body from the ends of the trunnions to the distribution insert and dividers are located in the bores to form two passages to each of the ends of the trunnions. Lubricant is supplied from the distribution insert to the ends of the trunnions and then back through the distribution insert sequentially until all of the trunnions and cups are lubricated.

When the lubricant reaches the distribution insert after the last trunnion, it is directed to a vent in the distribution insert. When the lubricant is visible at the vent, it is assured that all of the bearings and trunnions have been properly lubricated and there is adequate lubrication for all of the bearings. In a preferred embodiment, when the lubricant reaches the distribution insert after the last trunnion, it is directed to a fitting in the distribution insert which is connected via a hose or the like to a container for collecting any excess lubricant.

The distribution insert is designed to be made in a two-part mold not requiring any special molding inserts. This greatly decreases the cost of the mold.

In a preferred embodiment, the lubrication system has provisions for lubricant fittings in the cross body between the four trunnions for supplying lubricant to the insert from four locations. Threaded plugs can also be used in any location where there is no lubricant fitting to be employed. The distribution insert can also be modified to receive a control lubricant fitting therein. Hence, as many as five lubricant fittings can be employed in the lubrication system to suit the particular application.

BRIEF DESCRIPTION OF THE DRAWINGS

Many other objects and advantages of the invention will be apparent from the following detailed description of preferred embodiments thereof, reference being made to the accompanying drawings, in which:

FIGS. 6, 7, and 8 are fragmentary view in cross section taken along the lines 6—6, 7—7, and 8—8, respectively, of FIG. 5;

FIG. 9 is a fragmentary view in cross section of the divider and a bore taken along the line 9—9 of FIG. 1; and FIG. 10 is a view in central cross section of a slight modified distribution insert or cup with a central lubrication fitting.

DETAILED DESCRIPTION OF PREFERRED EMBODIMENTS

Figure 1:
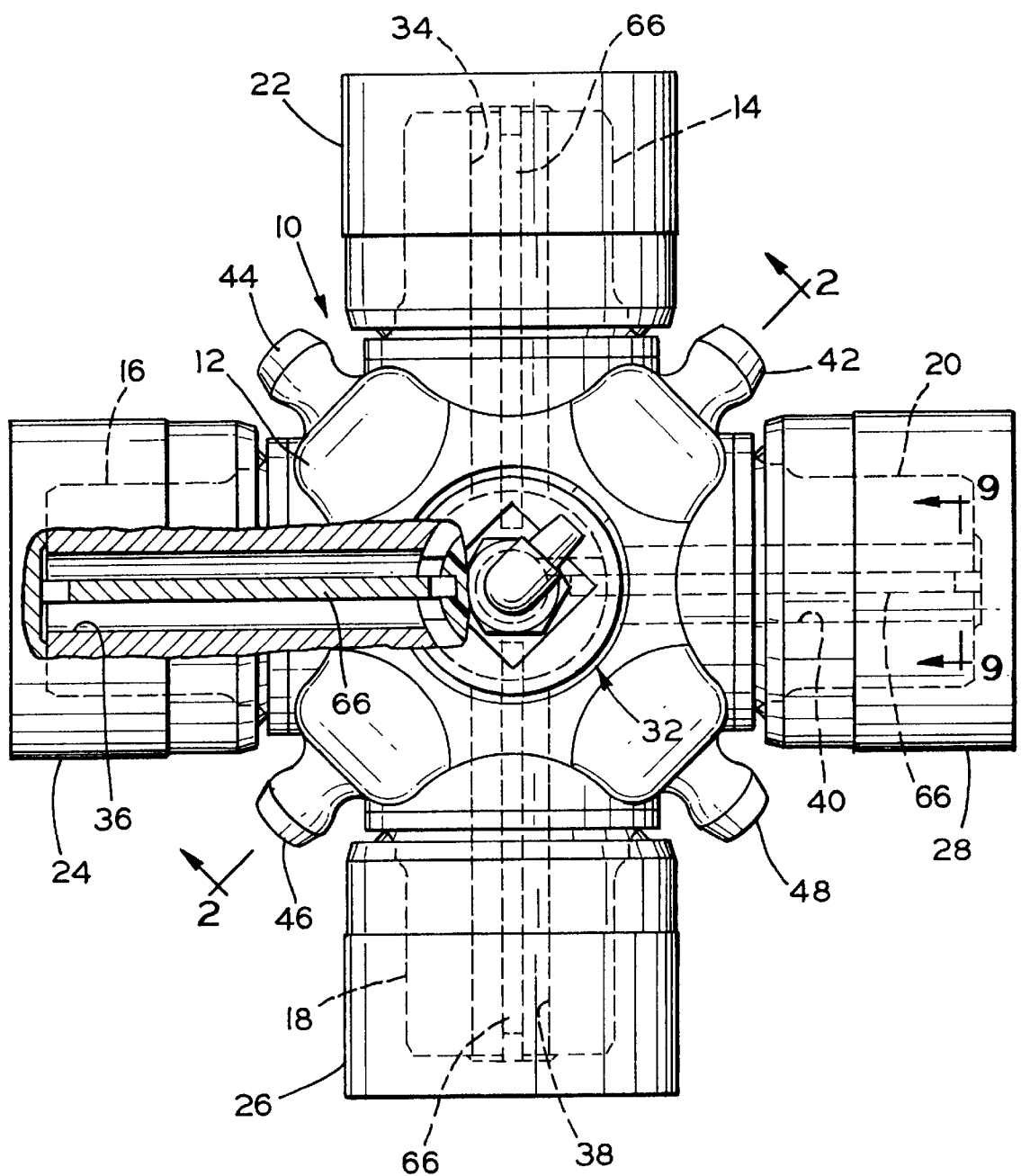
FIG. 1 is a top view of a universal joint cross assembly having a lubrication system embodying the invention, with parts broken away and with parts in cross section.

Referring to the drawings, and more particularly to FIG. 1, a universal joint cross assembly 10 includes a cross body 12 and four trunnions 14, 16, 18 and 20 extending outwardly therefrom along mutually-perpendicular lines. There are four bearing cups 22, 24, 26 and 28 with needle bearings (not shown) between the trunnions and the cups and seals at the outer ends of said bearings.

Figure 2:
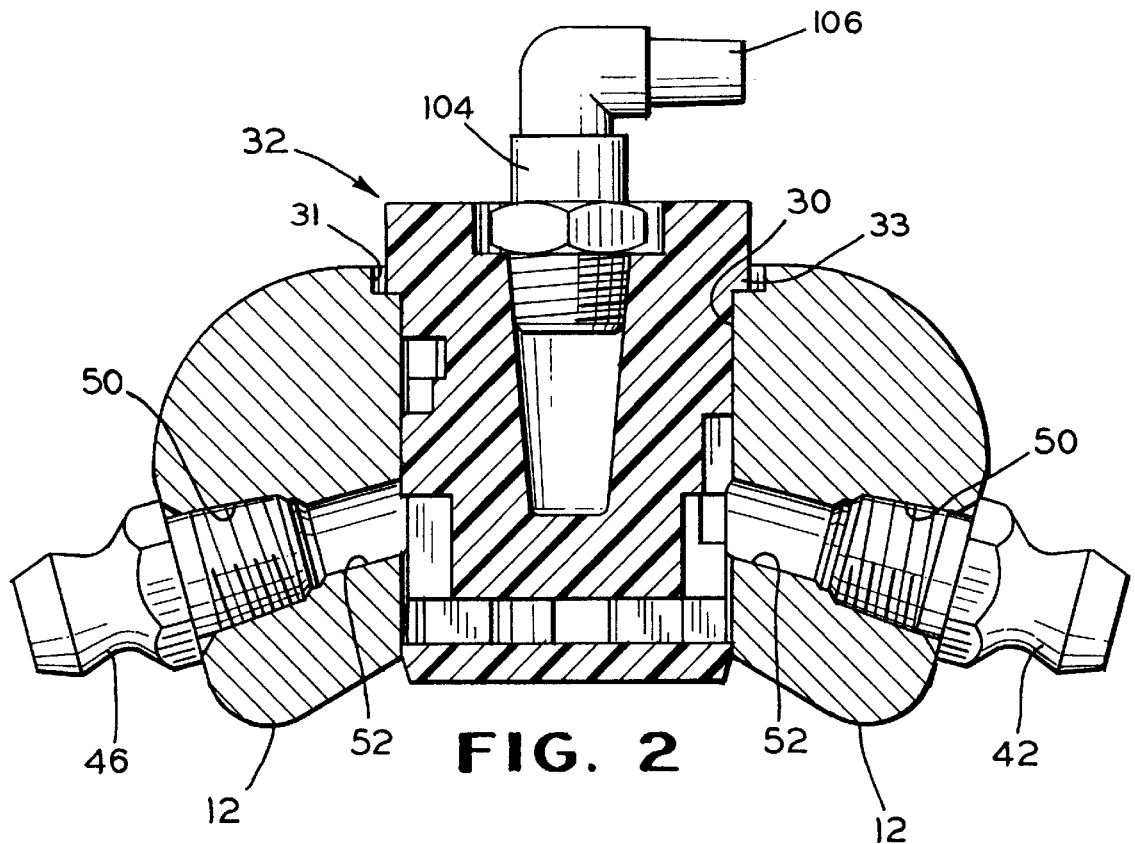
FIG. 2 is an enlarged, fragmentary view in cross section taken along the line 2—2 of FIG. 1.

As best illustrated in FIG. 2, a central cavity or hole 30 in the cross body 12 contains a distribution insert or cup 32 with a tight fit. The distribution insert 32 includes a shoulder 33 which is received in a recess 31 formed in the body 12 about the central hole 30. Bores 34, 36, 38, and 40 are formed in the cross body 12 and extend from the ends of the trunnions 14–20 to the central cavity 30.

Figure 6:
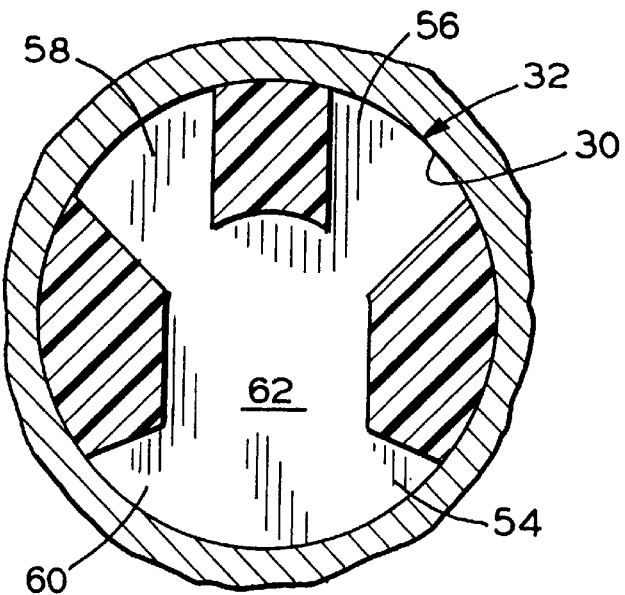

One or more lube fittings are provided in the cross body 12 or in the insert 32, or in both. In the illustrated embodiment, four lubes fittings 42, 44, 46 and 48 are located in the cross body 12 between the trunnions. The lube fittings are turned into threaded bores 50 (FIG. 2) and communicate with passages 52 which extend to the distribution insert 32. From the selected passage 52, the lubricant moves down through the associated channels 54, 56, 58, and 60 (see FIGS. 6 and 7) to a lower manifold 62 formed in the insert 32.

Figure 7:
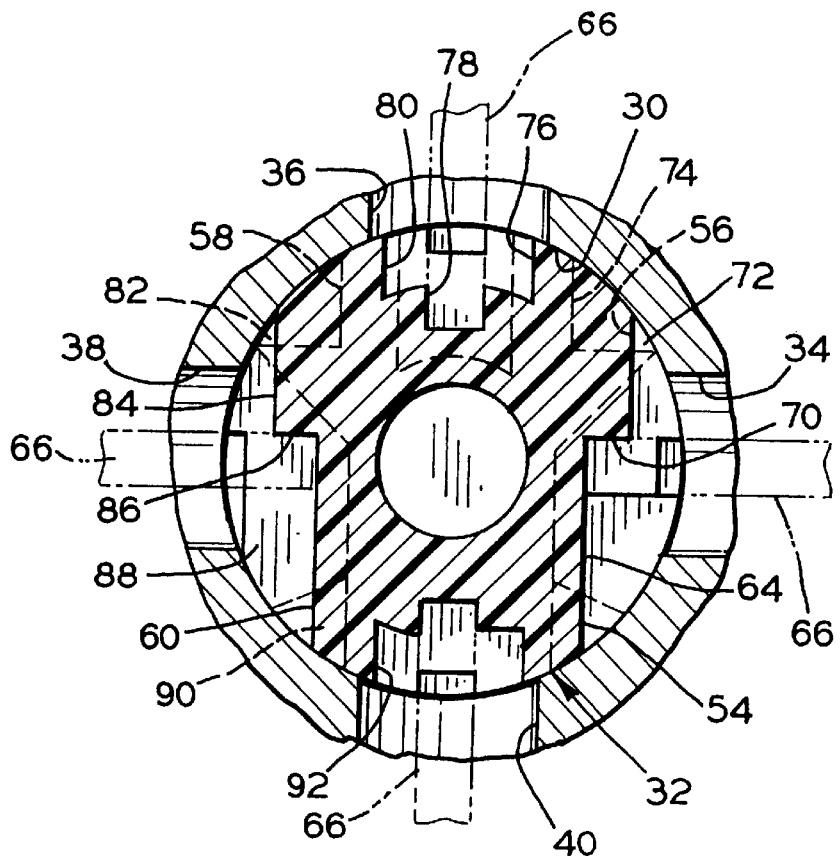

Regardless of which fitting is utilized to introduce the lubricant, when the manifold 62 is full, the lubricant moves up through the channel 54 to a first transverse passage 64 (see FIG. 7). From here it moves to a first vertical divider 66 which is located in the bore 34 (see FIGS. 1 and 9). The divider 66 has a notch 68 in its outer end through which lubricant can pass at the end of the trunnion 14 and a narrower tang 69 at its inner end. The inner end of the divider 66 is received in a notch 70 (FIG. 7) in the distribution insert 32. This holds the divider 66 in place, and the divider also helps maintain the distribution insert 32 in place within the cross body 12, if necessary. The lubricant moves through the bore 34 on the side of the divider 66, passes through the outer end notch 68, and travels back to the distribution insert 32 on the other side of the divider 66. The lubricant also fills the cavity in cup 22 and moves outwardly to the needle bearings (not shown) between the cup 22 and the trunnion 14.

The lubricant then moves beyond the bore 34 and through transverse passages 72, 74, and 76 (see also FIG. 8) to the bore 36 containing another one of the dividers 66. The lubricant then moves out of the bore 36 to the end of the trunnion 16 and back through the outer end notch of the divider 66, filling the cup 24 with lubricant. This second divider is received in a notch 78 formed in the distribution insert 32.

The lubricant then continues through transverse passages 80, 82, and 84 to the next divider 66 located in the bore 38. This divider is located in a notch 86 (see FIGS. 3 and 8) formed in the distribution insert 32. The lubricant then extends out through the bore 38 to the end of another of the dividers 66 and back again to the distribution insert 32.

Figure 3:
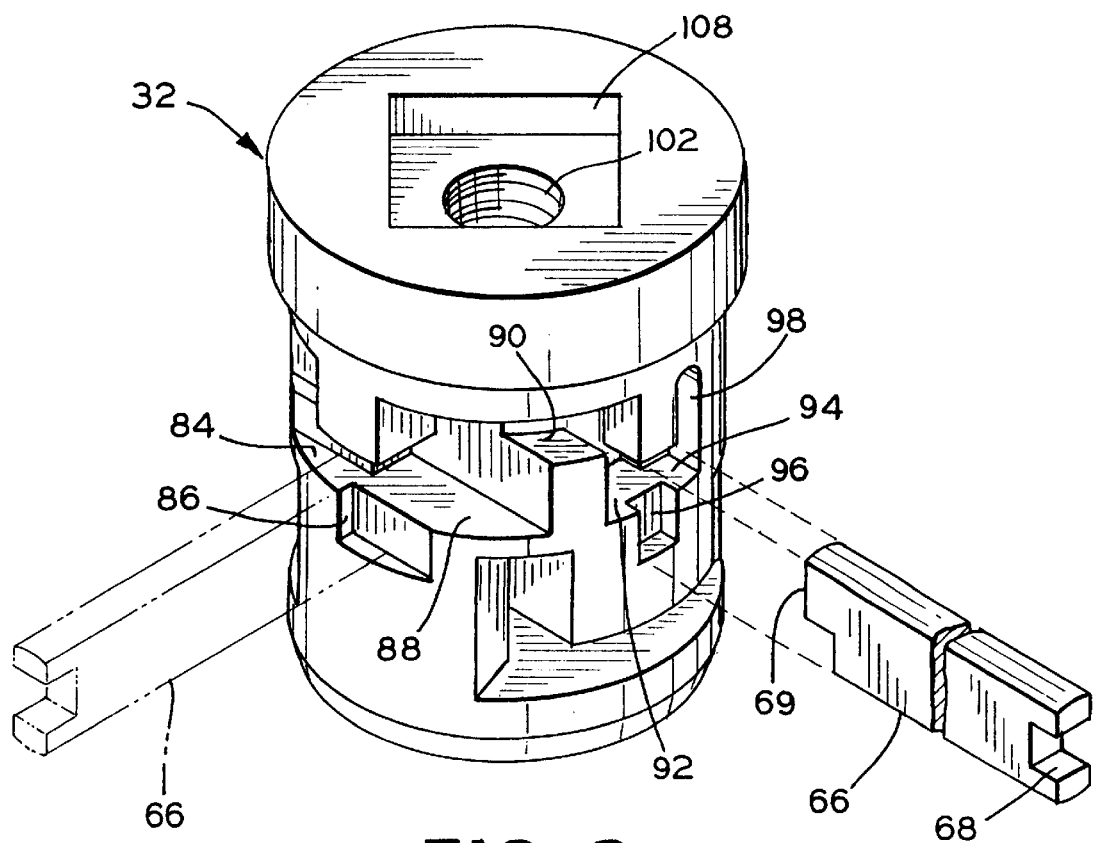
FIG. 3 is a view in perspective of a distribution insert or cup along with a divider.
Figure 4:
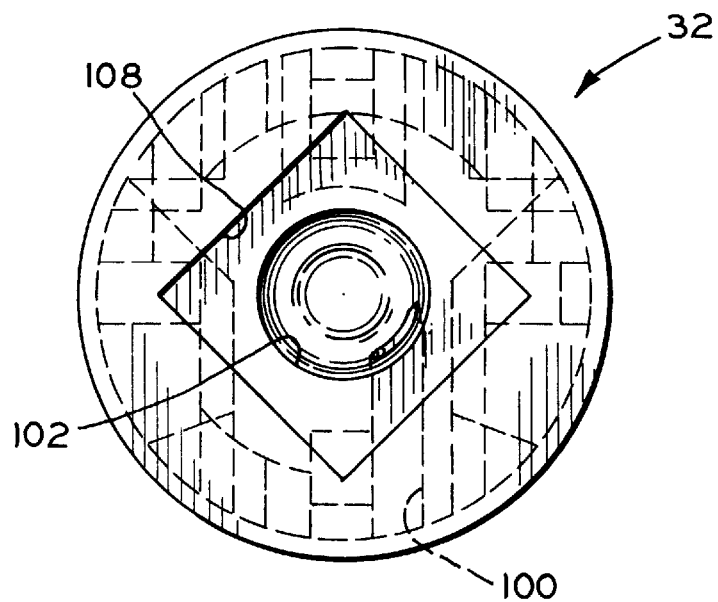
FIG. 4 is a top view of the insert of FIG. 3.
Figure 5:
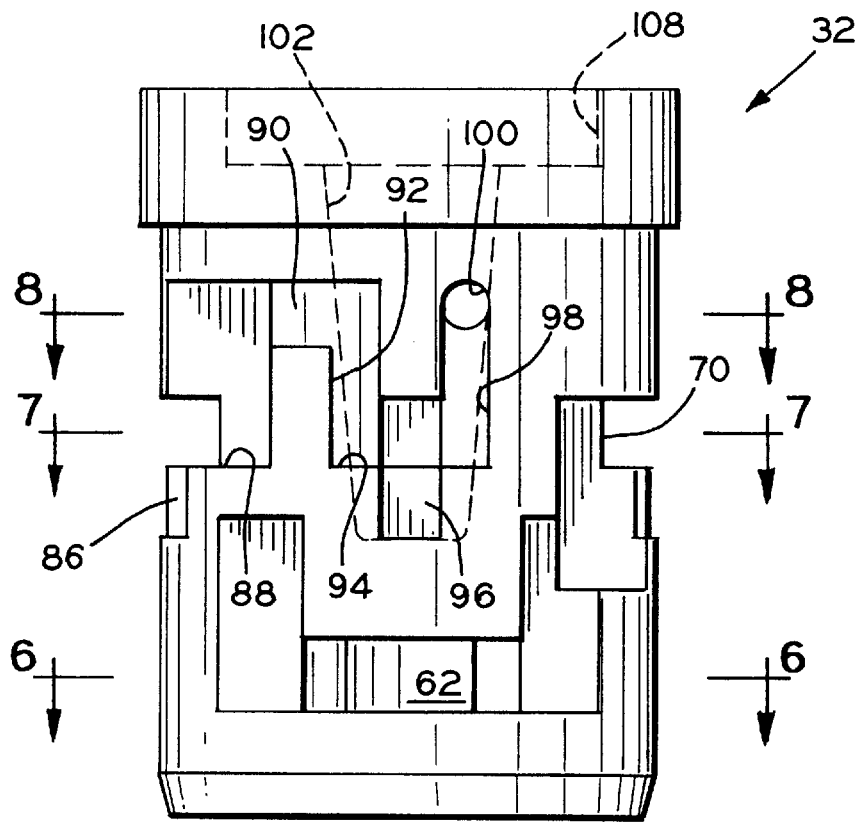
FIG. 5 is a side view in elevation of the insert of FIGS. 3 and 4.

At this point, the lubricant moves through transverse passages 88, 90, and 92 (see FIGS. 3 and 8). It then contacts the divider 66 which is disposed within the bore 40. The lubricant then moves through the bore 40 along the divider 66 to the trunnion 20 and back again to a transverse passage 94 in the insert 32, the divider in this case being held in a notch 96 (FIG. 3). The lubricant then moves up a vertical passage or channel 98 to a transverse passage 100 in the distribution insert 32.

As best illustrated in FIG. 10, the passage 100 communicates with a bore 102 centrally located in the distribution insert 32. The bore 102 may be left open to the environment and act as a vent, so that when the lubricant is visible at the bore 102, it is assured that all of the bearings and trunnions have been properly lubricated and there is adequate lubrication for all of the bearings. In a preferred embodiment, however, a vent fitting 104 is threadedly received in the bore 102. Thus, when the lubricant reaches the distribution insert 32 after the last trunnion, it is directed to the fitting 104, which may be connected via a hose 106 or the like to a container (not shown) for collecting any excess lubricant.

The top of the distribution insert 32 may be provided with has a recessed square configuration 108, as best shown in FIG. 3, which is for orientation purposes to assure that the notches for the various dividers 66 are properly aligned with the associated bores.

From the above, it will be seen that the lubricant system has multiple locations in which lube fittings can be employed. Also, with the stepped configuration of the various transverse passages, the distribution insert of the invention can be made in a two-part mold without any mold inserts being necessary. Such mold inserts add substantially to the cost of the mold. Again, the lubricant system in accordance with the invention is particularly effective with small universal joints. In one instance, the distribution insert is only about the size of a thimble.

In addition, in a preferred embodiment, when the lubricant reaches the distribution insert after the last trunnion, it is directed to a fitting in the distribution insert which is connected via a hose or the like to a container for collecting any excess lubricant. As a result, the uncontrolled discharge of the lubricant into the environment is avoided.

Various modifications of the above-described embodiments of the invention will be apparent to those skilled in the art, and it is to be understood that such modifications can be made without departing from the scope of the invention, if they are within the spirit of and the tenor of the accompanying claims. As an example, the distribution insert can be adapted to include a threaded bore therein located opposite the fitting 104 to receive a lube fitting (not shown) centrally located in the cross. When such a central fitting is employed, a passage in the insert is formed which communicates directly with the manifold 62. Of course, when the manifold 62 is full, the lubricant travels up the passage 54 and moves around the bores and dividers as before.

What is claimed is:

1. A universal joint cross assembly comprising a cross having a body and four trunnions located on a mutually perpendicular lines, bearing cups for said trunnions, a distribution insert located centrally in said body, bores connecting said distribution insert and said four trunnions, a divider located in each of said bores and dividing each of said bores into two passages, at least one fitting secured to said cross body for supplying lubricant to said distribution insert, said distribution insert having insert passages therein arranged such that lubricant is supplied sequentially to the four trunnions through the passages in said bores.

2. A universal joint cross assembly according to claim 1, wherein said distribution insert includes a vent which communicates with said insert passages so that when lubricant appears at the vent, all of said four trunnions have been sequentially and properly lubricated.

3. A universal joint cross assembly according to claim 2, wherein said vent is comprised of a threaded bore, further comprising a vent fitting received in the bore, so that excess lubricant can be carried from the cross assembly once all of said four trunnions have been sequentially and properly lubricated.

4. A universal joint cross assembly according to claim 2, wherein said vent fitting is connected to a hose for communicating excess lubricant from said cross assembly.

5. A universal joint cross assembly according to claim 1, wherein said distribution insert has notches which receive the respective ends of said dividers.

6. A universal joint cross assembly according to claim 1, wherein said distribution insert has a manifold in a lower end thereof and communicating with said at least one fitting.

7. A universal joint cross assembly according to claim 1, wherein said body has a central hole therein and said distribution insert is located in said central hole.

8. A universal joint cross assembly according to claim 7, wherein said central hole is cylindrical and said distribution insert is cylindrical and located in said central hole.

9. A universal joint cross assembly according to claim 8, wherein said distribution insert has an annular shoulder and said body has an annular recess around said central hole in which said distribution insert shoulder is received.

10. A universal joint cross assembly according to claim 1, wherein there are four of said fittings in at least four locations in said cross body between said four trunnions.

11. A universal joint cross assembly comprising a cross having a body and four trunnions located on a mutually perpendicular lines, bearing cups for said trunnions, a distribution insert located centrally in said body and having a central bore, bores connecting said distribution insert and said four trunnions, a divider located in each of said bores and dividing each of said bores into two passages, at least one fitting secured to said cross body for supplying lubricant to said distribution insert, and a vent fitting received in the central bore of said distribution insert, said distribution insert having insert passages therein arranged such that lubricant is supplied sequentially to the four trunnions through the passages in said bores and then to said central bore, so that excess lubricant can be carried from the cross assembly through the vent fitting once all of said four trunnions have been sequentially and properly lubricated.

* * * * *